(12) United States Patent (10) Patent No.: US 9,204,121 B1
Marason et al. (45) Date of Patent: Dec. 1, 2015

(54) REFLECTOR-BASED DEPTH MAPPING OF A SCENE

(71) Applicant: Rawles LLC, Wilmington, DE (US)

(72) Inventors: Eric G. Marason, San Francisco, CA (US); Christopher D. Coley, Morgan Hill, CA (US); William Thomas Weatherford, San Mateo, CA (US)

(73) Assignee: Amazon Technologies, Inc., Seattle, WA (US)

( * ) Notice: Subject to any disclaimer, the term of this patent is extended or adjusted under 35 U.S.C. 154(b) by 504 days.

(21) Appl. No.: 13/685,535

(22) Filed: Nov. 26, 2012

(51) Int. Cl.
*H04N 13/00* (2006.01)
*H04N 13/02* (2006.01)

(52) U.S. Cl.
CPC ................................ *H04N 13/0007* (2013.01)

(58) Field of Classification Search
CPC ........... H04N 13/0271; H04N 13/0275; G06T 7/0075
USPC ..................... 348/42, 36, 46, 51, 56, 49, 135; 345/419
See application file for complete search history.

(56) References Cited

U.S. PATENT DOCUMENTS

| 8,643,950 | B2 * | 2/2014 | Konig | 359/630 |
| 8,760,499 | B2 * | 6/2014 | Russell | 348/46 |
| 8,992,050 | B1 * | 3/2015 | Yuan et al. | 362/293 |
| 2012/0223885 | A1 | 9/2012 | Perez | |

FOREIGN PATENT DOCUMENTS

WO WO2011088053 A2 7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Jefferey Harold
*Assistant Examiner* — Jean W Desir
(74) *Attorney, Agent, or Firm* — Lee & Hayes, PLLC

(57) ABSTRACT

The depth of one or more objects within a scene may be determined utilizing system that includes a single light source, a reflector (e.g., an ellipsoidal reflector), a shutter mechanism associated with the light source, and a camera. More particularly, the light source may output light that is directed towards the scene (a first set of light beams) and towards the reflector (a second set of light beams) utilizing the shutter mechanism. The reflector may reflect the second set of light beams towards the scene. The camera may then capture a first image that corresponds to the first set of light beams and a second image that corresponds to the second set of light beams. The depth of a particular one of the objects within the scene may be determined based at least in part on the first image and the second image.

22 Claims, 9 Drawing Sheets

REFLECTOR-BASED DEPTH MAPPING OF A SCENE

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

Various systems and processes have been used to determine the depth or three-dimensional (3D) orientation of a scene. For instance, the spatial relationships between objects within the scene may be determined in order to create a virtual representation of the scene. Typically, multiple light sources are used to illuminate the scene, which may allow a camera to capture one or more images of the scene. These images may be processed for the purpose of mapping the depth of objects within the scene. However, since different light sources decay at different rates, utilizing multiple independent light sources would likely require an operator of the system to calibrate and recalibrate the system on an ongoing basis. Frequent recalibration of the system would be inefficient, cost-intensive, and would require the consumption of other resources.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
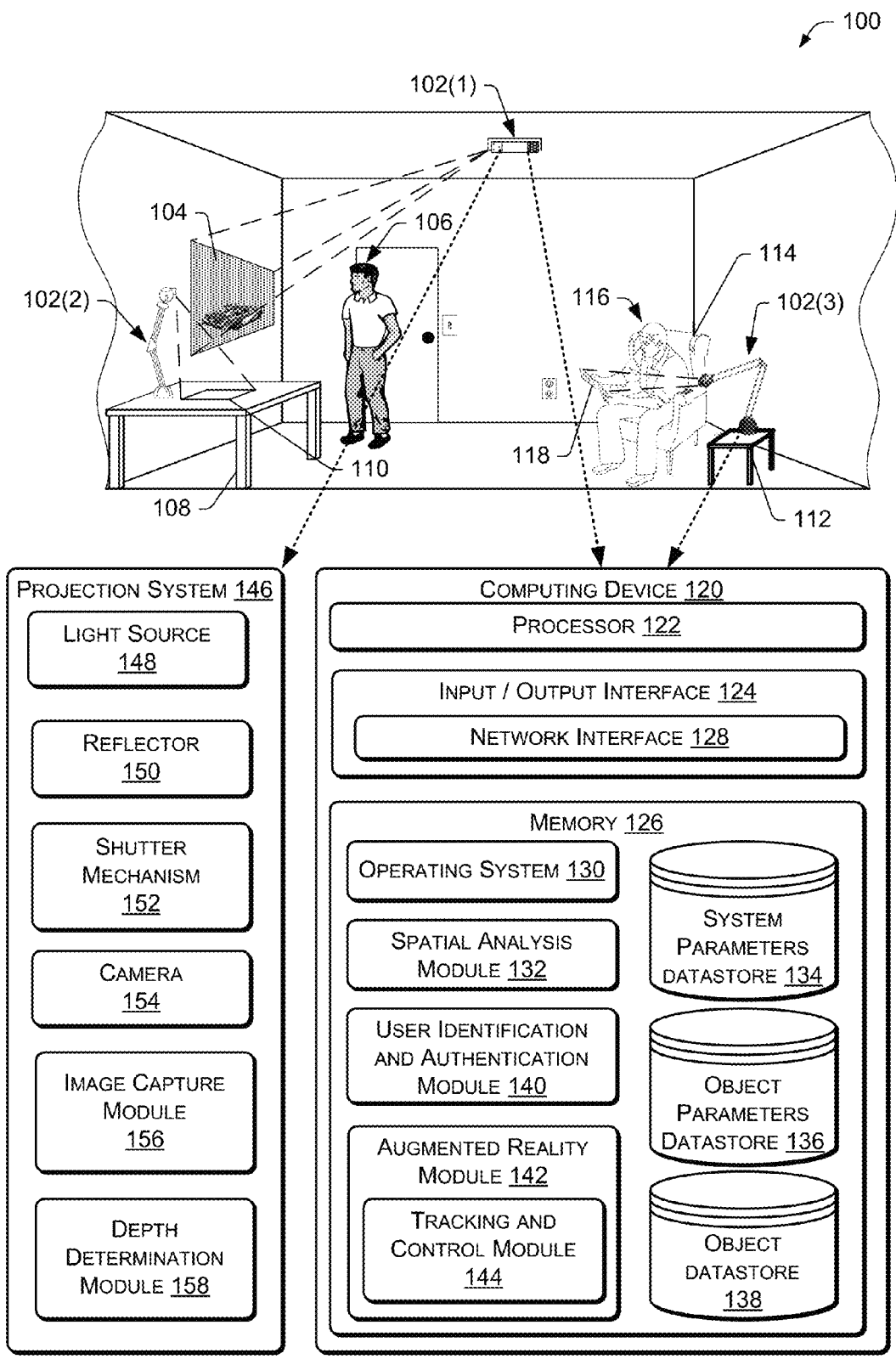
FIG. 1 shows an illustrative scene with an augmented reality environment hosted in an environmental area, such as a room. The augmented reality environment is provided, in part, by three projection and image capture systems that may be configured to generate a three-dimensional (3D) depth map of the environment.

This disclosure describes systems and/or processes for determining the three-dimensional (3D) depth of a scene, including objects within the scene, utilizing a light source, a reflector, a shutter mechanism, and a camera. More particularly, the light source may output multiple light beams and may be positioned in close proximity to the reflector (e.g., an ellipsoidal reflector). The shutter mechanism may selectively or alternatively block light being directed at the reflector and light being directed away from the reflector, thus causing the light to illuminate the scene as if the light was being emitted from two different, coaxial points. The camera may be synchronized with the shutter mechanism such that the camera may capture two images of the scene. The first image may represent the scene when the light is being directed away from the reflector and towards the scene and the second image may represent the scene when the light is being directed towards the scene and away from the reflector.

Accordingly, the first image may correspond to a time when the light is being directed away from the reflector and directly at the scene. On the contrary, the second image may represent the scene when the light is being directed at the reflector, which then reflects the light to cause an illumination of the scene. Utilizing these two images, the systems and processes described herein may generate a third image that represents a 3D, and possibly high-definition, depth map of the scene. In particular, the 3D representation or image of the scene may be generated by combining the first image and the second image utilizing a pixel-by-pixel process. In various embodiments, this 3D representation of the scene may map the orientation of the scene, including the spatial relationships between objects within the scene.

As stated above, existing systems typically use multiple light sources to illuminate a scene and then capture an image of the illuminated scene in order to determined depth information of the scene. That is, since the illumination of each of the multiple light sources may be known, these systems may measure the illumination of the scene with respect to each light source to determine the distance between objects within the scene. However, although the relative strength of the illumination for each light source may be initially measured under known conditions, the illumination will change over time due to a variety of reasons (e.g., age of the light sources, manufacture of the light sources, changes in other characteristics within the scene, etc.). As a result, when utilizing multiple different light sources, the system may need to be recalibrated on an ongoing basis.

As a result, the systems and processes described herein may utilize a single light source to determine depth information associated with the scene, without having to recalibrate the system after parameters associated with the reflector and the shutter mechanism are initially determined. Since recalibration of the system may be resource-intensive (e.g., time, cost, etc.), utilizing a single light source with an associated shutter mechanism in order to obtain depth information for a scene, as described herein, is likely to increase the efficiency of the system.

In various embodiments, augmented reality environments may allow users to interact with physical and virtual objects in a physical space. Augmented reality environments may be formed through systems of resources such as cameras, projectors, computing devices with processing and memory capabilities, and so forth, which may perform the processes described above and set forth below. The projectors may project images onto the surroundings that define the environment and the cameras monitor and capture user interactions with such images. A depth map or a 3D representation of the environment may help allow the system to determine the spatial orientation of objects within the environment, which may allow the projectors to accurately project images at appropriate locations within the environment.

An augmented reality environment may be commonly hosted or otherwise set within a surrounding area, such as a room, building, or other type of space. In some cases, the augmented reality environment may involve the entire surrounding area. In other cases, an augmented reality environment may involve a localized area of a room, such as a reading area or entertainment area.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN 102 contains projectors, cameras, and computing resources that are used to generate the augmented reality environment 100. For the purposes of this discussion, the scene may correspond to any physical space, physical environment, physical volume, physical area, etc., that may include one or more ARFNs 102, such as a room or multiple rooms, for example. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth. In embodiments where multiple ARFNs are placed within the room, the light source from one of the ARFNs may be utilized by a different ARFN, provided that the relative positions with respect to each ARFN are known. Moreover, the light source of one of the ARFNs may be multiplexed (e.g., spectrally multiplexed, time-division multiplexed, etc.) with the light source of a different one of the ARFNs.

Associated with each ARFN 102(1)-(3), or with a collection of ARFNs 102, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. As discussed in additional detail below, the spatial analysis module 132 may function in conjunction with a projection system 146, which may include a light source 148, a reflector 150, a shutter mechanism 152, a camera 154, an image capture module 156, and a depth determination module 158. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras 154 and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

In addition to the computing device 120, the ARFN 102(1) may maintain, or may be otherwise associated with, the projection system 146, which may include the light source 148, the reflector 150, the shutter mechanism 152, the camera 154, the image capture module 156, and the depth determination module 158. In other embodiments, the projection system 146, including some or all of the light source 148, the reflector 150, the shutter mechanism 152, and/or the camera 154, may be maintained in one or more locations separate from the ARFN 102. That is, the light source 148, the reflector 150, the shutter mechanism 152, and the camera 154 may reside in the projection system 146, while the image capture module 156 and the depth determination module 158 may be stored in, or associated with, the computing device 120. The light source 148 may be any type of source or device that emits, projects, or outputs any type of light. For the purposes of this discussion, although any type of light source and type of light is contemplated herein (e.g., visible light, non-visible light, ultraviolet light, infrared light, etc.), the light source 148 and/or the emitted light may be referred to as light, a light beam, or a beam of light. In various embodiments, the light source 148 may be omnidirectional, meaning that the light source 148 may output light in multiple different directions.

The reflector 150 may be configured to reflect or redirect light output by the light source 148 within the environment. In certain embodiments, the reflector 150 may be in the shape of an ellipsoid (e.g., an ellipsoidal reflector) and light source 148 may be positioned in close proximity to the reflector 150. More particularly, the light source 148 may be positioned near the focus of the reflector 150 such that the light may be directed at the reflector 150 or, instead, away from the reflector 150 and towards the environment.

In addition, the shutter mechanism 152 may be associated with the light source 148 and may cause the light to be output in different directions. More particularly, the shutter mechanism 152 may include one or more mechanical shutters that cause the light to be output in one direction, but not in another direction. For instance, the shutter mechanism 152 may alternately block the light from being output from the light source 148, such that the shutter mechanism 152 may alternately block the light being directed at the reflector 150 and the light being directed away from the reflector 150 and at the environment. In various embodiments, when light may be directed away from the reflector 150 at any angle, such as 180 degrees from the reflector 150. Upon being directed at the reflector 150, the light may then be reflected within the environment. As a result, the shutter mechanism 152 may cause the light to illuminate the environment from two different points—(1) a point in close proximity to the light source 148 and (2) a point that corresponds to where the reflected light beams converge.

The camera 154 may capture one or more images of the environment. In particular, the image capture module 156 may cause the camera 154 to be synchronized with the shutter mechanism 152, which may allow the camera 154 to capture a first image of the environment when the light is being directed towards the reflector 150 and then reflected within the environment and a second image when the light is being directed away from the reflector 150 and directly towards the environment. Since the light is being directed towards the environment from two different points, the first image and the second image may each represent a different distance to a particular object (e.g., user, table, etc.) within the environment.

Upon capturing the first image and the second image, the depth determination module 158 may generate a third and final image that represents the spatial relationship of objects within the environment. That is, by utilizing the two images to determine the distance to a particular object within the environment (e.g., a distance to the object from the first image and a distance to the object from the second image), the depth determination module 158 may generate a depth map that corresponds to a 3D representation of the environment. From this depth map, the depth determination module 158 may accurately determine the depth of, or the distance to, the object, and the distance between that object and other objects within the environment.

Figure 2:
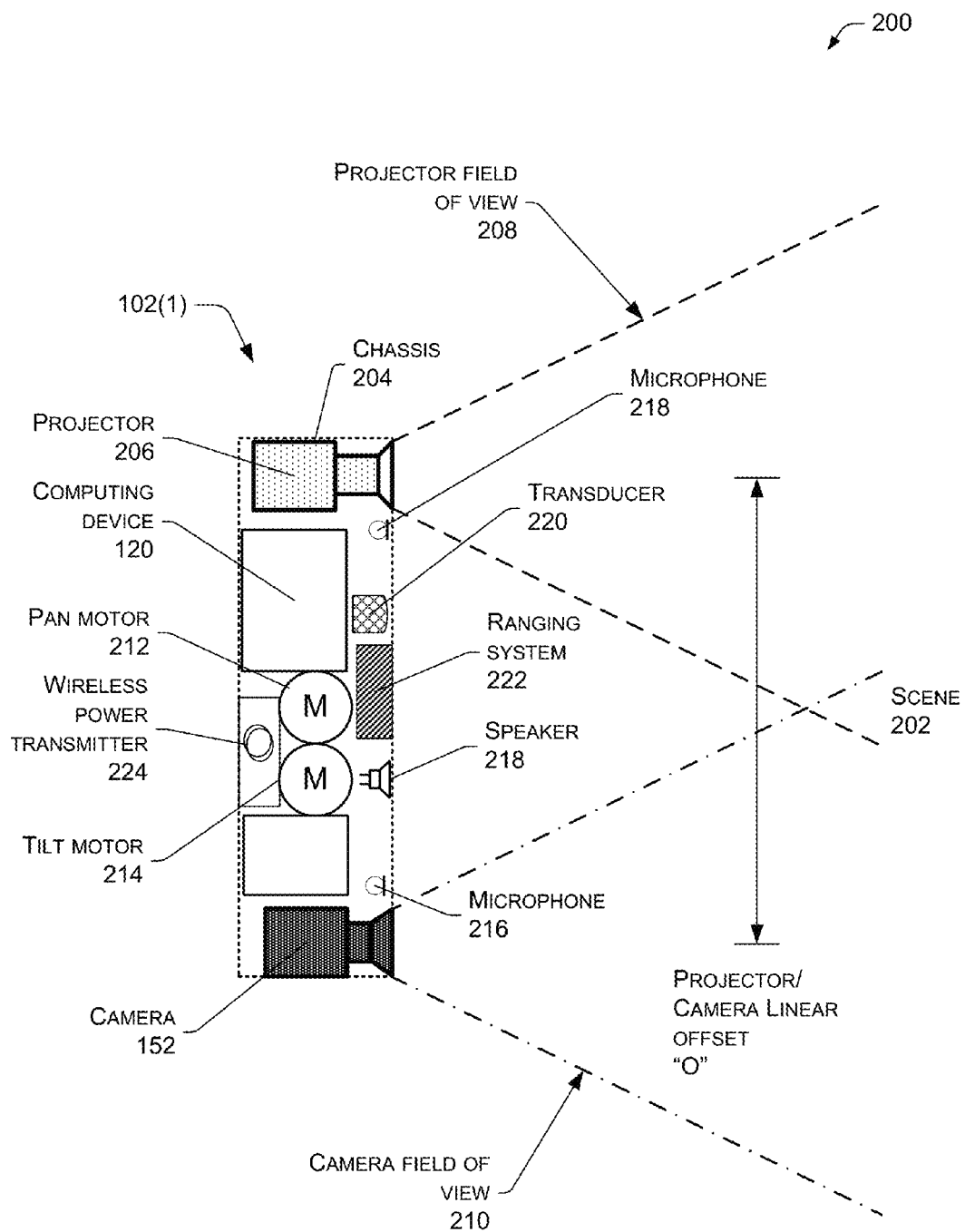
FIG. 2 shows a first implementation of a projection and image capturing system formed as an augmented reality functional node having a chassis to hold a projector and camera in spaced relation to one another. In this implementation, the projector and camera have different optical paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth. In addition, the ARFN 102(1) may include one or more components, modules, or associated devices that are configured to illuminate or energize one or more phosphors utilizing a light source 148 (e.g., a laser, etc.), thus causing each of the phosphors to emit a particular color. Such a color may be projected or otherwise output within an environment associated with the ARFN 102(1).

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) 154 and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 154 may also be disposed within the chassis 204. In some embodiments, the camera 154 may correspond to the camera 154 illustrated in FIG. 1, or a different camera. The camera 154 is configured to image the scene in visible light wavelengths, non-visible light wavelengths, or both. The camera 154 may be implemented in several ways. In some instances, the camera 154 may be embodied a red, green, blue (RGB) camera 154. In other instances, the camera 154 may include time of flight (ToF) sensors. In still other instances, the camera 154 may be a red, green, blue, z-depth (RGBZ) camera 154 that includes both ToF and RGB sensors. The camera 154 has a camera field of view 210 which describes a particular solid angle. The camera field of view 210 may vary according to changes in the configuration of the camera 154. For example, an optical zoom of the camera 154 may narrow the camera field of view 210. In some implementations, a plurality of cameras 154 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 154. For example, in one implementation, the actuator may comprise a pan motor 212, tilt motor 214, and so forth. The pan motor 212 is configured to rotate the chassis 204 in a yawing motion. The tilt motor 214 is configured to change the pitch of the chassis 204. By panning and/or tilting the chassis 204, different views of the scene may be acquired. The spatial analysis module 132 may use the different views to monitor objects within the environment.

One or more microphones 216 may be disposed within the chassis 204, or elsewhere within the scene. These microphones 216 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 216 may be used to receive voice input from the user for purposes of identifying and authenticating the user.

One or more speakers 218 may also be present to provide for audible output. For example, the speakers 218 may be used to provide output from a text-to-speech module, to playback pre-recorded audio, etc.

A transducer 220 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 222 may also be provided in the ARFN 102 to provide distance information from the ARFN 102 to an object or set of objects. The ranging system 222 may comprise radar, light detection and ranging (LIDAR), ultrasonic ranging, stereoscopic ranging, and so forth. In some implementations, the transducer 220, the microphones 216, the speaker 218, or a combination thereof may be configured to use echolocation or echo-ranging to determine distance and spatial characteristics.

A wireless power transmitter 224 may also be present in the ARFN 102, or elsewhere within the augmented reality environment. The wireless power transmitter 224 is configured to transmit electromagnetic fields suitable for recovery by a wireless power receiver and conversion into electrical power for use by active components in other electronics, such as a non-passive screen 118. The wireless power transmitter 224 may also be configured to transmit visible or non-visible light to communicate power. The wireless power transmitter 224 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

The ARFN 102(1) is characterized in part by the offset between the projector 206 and the camera 154, as designated by a projector/camera linear offset "O". This offset is the linear distance between the projector 206 and the camera 154. Placement of the projector 206 and the camera 154 at distance "O" from one another aids in the recovery of structured light data from the scene. The known projector/camera linear offset "O" may also be used to calculate distances, dimensioning, and otherwise aid in the characterization of objects within the scene 202. In other implementations, the relative angle and size of the projector field of view 208 and camera field of view 210 may vary. Also, the angle of the projector 206 and the camera 154 relative to the chassis 204 may vary.

Due to this offset "O", the projector 206 and camera 154 employ separate optical paths. That is, the projector 206 employs a set of lenses to project images along a first optical path therein, and the camera 154 employs a different set of lenses to image the scene by capturing the light scattered by the surroundings.

In other implementations, the components of the ARFN 102(1) may be distributed in one or more locations within the environment 100. As mentioned above, microphones 216 and speakers 218 may be distributed throughout the scene. The projector 206 and the camera 154 may also be located in separate chassis 204.

Figure 3:
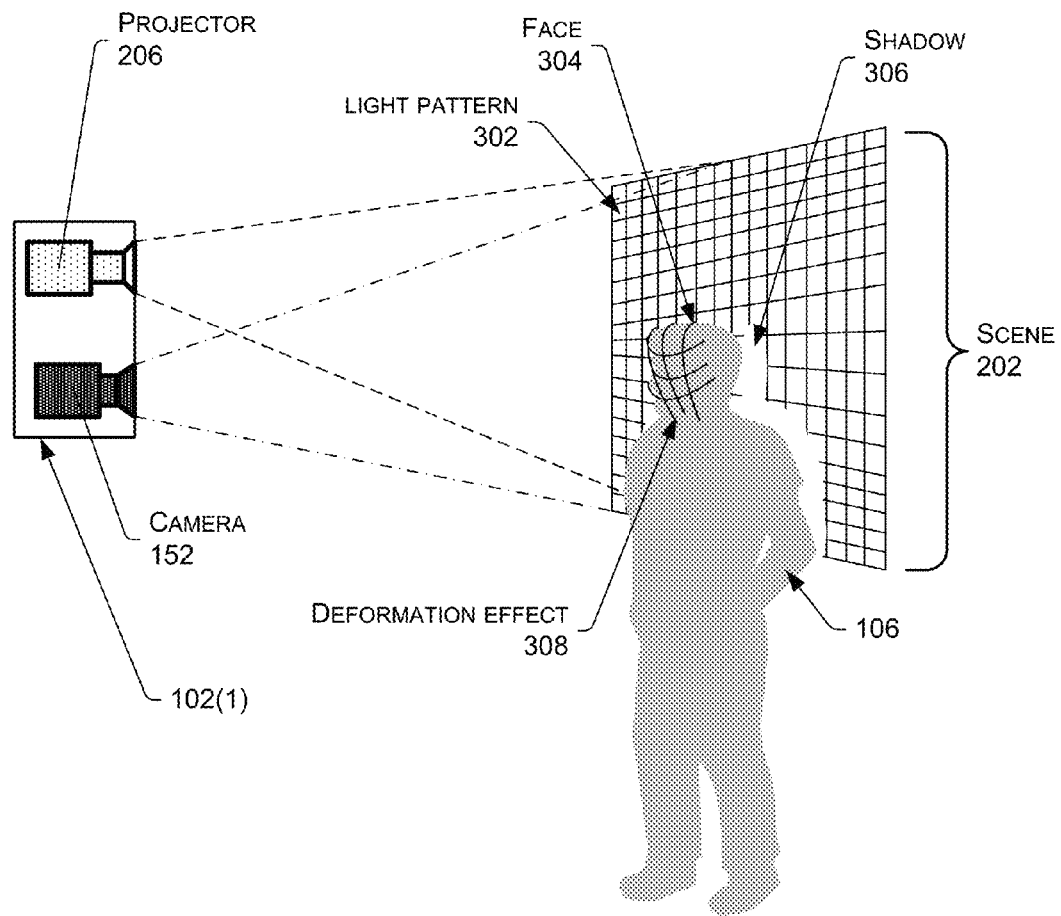
FIG. 3 illustrates one example implementation of creating an augmented reality environment by projecting a light pattern on a scene and capturing a corresponding image of the scene.

FIG. 3 illustrates one example operation 300 of the ARFN 102(1) of creating an augmented reality environment by projecting a light pattern on a scene and capturing a corresponding image of the scene. In this illustration, the projector 206 within the ARFN 102(1) projects a light pattern 302 onto the scene 202. In some implementations, a sequence of different light patterns 302 may be used. This light pattern 302 may be in wavelengths which are visible to the user, non-visible to the user, or a combination thereof. The light pattern 302 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect 308 is produced on the shape of the user's face 304 as the light pattern 302 interacts with the facial features. This deformation effect 308 is detected by the camera 154, which is further configured to sense or detect the light. In some implementations, the camera 154 may also sense or detect wavelengths other than those used for light pattern 302.

The images captured by the camera 154 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

As noted above, the design of the first ARFN 102(1) employs a projector/camera offset where the camera 154 and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector 206 and camera 154 to share a common optical path. In this design, the form factor may be reduced. In the example shown in FIG. 1, the ARFNs 102(2) and 102(3) are embodied as common table lamps, where the projector 206 and camera 154 reside in a head of the lamp.

Figure 4:
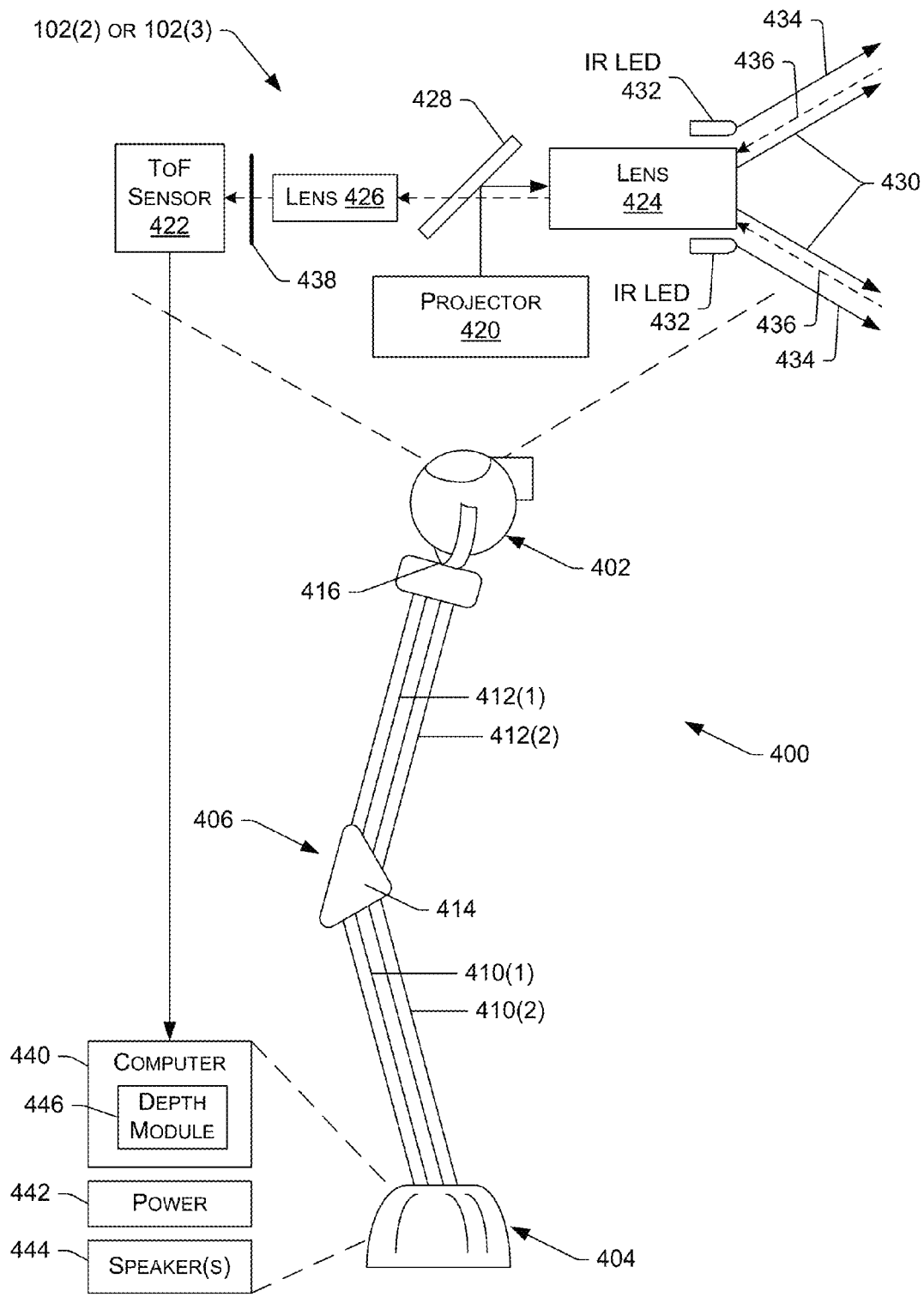
FIG. 4 shows a second implementation of a projection and image capturing system formed as a familiar type of furniture, such as a table lamp. In this implementation, the projector and camera share a common optical path through a common lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). The universal connector 416 is described below in more detail with reference to FIG. 7. In other implementations, the head 402 may be mounted to the arm mechanism 406 in a fixed manner, with no movement relative to the arm mechanism 406, or in a manner that enables more or less than two degrees of freedom. In still another implementation, a pan may be coupled to the base 404 to enable rotation of the arm mechanism 406 and the head 404.

The head 402 holds several components, including a projector 420 and a ToF sensor 422. In this example, the ToF sensor 422 measures IR signal reflections from objects within the scene. The ToF sensor 422 may be implemented as a standalone sensor, or as part of a camera 154. The head also contains one or more lenses, including a first lens 424 and a second lens 426. The first lens 424 may be implemented in a number of ways, including as a fixed lens, wide angle lens, or as a zoom lens. When implemented as a zoom lens, the lens may have any zoom range, with one example being 17-50 mm. Use of a zoom lens also offers additional advantages in that a zoom lens permits a changeable field of view, which can increase pixel resolution for better gesture recognition. Further, by zooming in, the device can decrease the field of view and enable the ability to discern fingers that were not resolved in non-zoomed (larger field of view) state. The lens 424 may further include a motorized focus, a motorized zoom, and a motorized iris.

The second lens 426 is provided to adjust for the differences between the projection imager and the ToF imager. This allows for the device to set relative coverage of the two imagers (e.g., overscan/underscan).

The projector 420 projects an image that is reflected off an angled beam splitter 428 and out through the lens 424. The beam splitter 428 may be, for example, embodied as a dichroic beam splitter having a coated prism assembly that employs dichroic optical coatings to divide light. The projected image has a field of view represented by the outgoing pair of arrows 430. In this manner, the visible and high intensity light from the projector can be zoomed for image projection on a wide range of surfaces, from near view to far view surfaces.

One or more IR emitters 432, such as IR LEDs, are positioned in the head 402 relative to the lens 424. The IR emitters 432 direct IR light in the direction of the projected image to illuminate the scene onto which the images are being projected. The IR emitters 432 may be arranged such that the illumination field is wider than the projected field, as represented by the outgoing pair of arrows 434.

The IR signals are scattered from objects in the scene and returned to the lens 424, as represented by the incoming pair of arrows 436. The captured IR signals are passed through the lens 424 and through the dichroic beam splitter 428 to the secondary lens 326. The IR signals are then optionally passed through an IR filter 438 (or other filter type) to the ToF sensor 422. In other implementations, the IR signals may be passed directly from the lens 426 to the ToF sensor 422, without going through the IR filter 438. Accordingly, the IR signals are emitted out from the head 402, scattered by the objects, and collected by the head 402 for capture by the ToF sensor 422 as a way to image the scene.

It is noted that, in other implementations, the projector 420 may be arranged to project an image that is passed through the beam splitter 428 and out through the lens 424, rather than being reflected by the beam splitter 428. In this arrangement, the returning IR signals maybe received back through the lens 424 and reflected by the beam splitter 428 to the lens 426 and ToF sensor 422. Said another way, the projector 420 and IR components (i.e., ToF sensor 422, lens 426 and optionally filter 438) may be swapped so that the returning IR signals are reflected by the beam splitter 428 rather than the projected image. Other arrangements may also be possible where at least part of the optical path is shared by the projection and depth capture.

The lamp-based ARFN 102(2) or 102(3) may also be equipped with one or more components in the base 404. In this example, a computer 440 resides in the base 404, along with power components 442 and one or more speakers 444. The computer may include processing and memory to execute instructions. A depth module 446 may be executed by the computer 440 to measure a time of flight for an IR signal (or other modulated light output). The time-of-flight value may be derived as a function of a time elapsed between emission from an IR LED 432 or an IR laser and capture by the ToF sensor 422. Alternatively, the time-of-flight value may be derived as a function of the phase difference between the modulated light output and the returned light. The depth module may be implemented in software or hardware. It is noted that in other implementations, the components shown as residing in the base 404 may reside in the head 402 or arm mechanism 406. For instance, the computer 440 may be located in the head, and the speakers may be 444 may be distributed in multiple locations, including the base, arm mechanism, and/or the head.

Notice that in this implementation of FIG. 4, the projector 420 and the sensor 422 share a common optical path through a common lens 424. As a result, the ARFN may be made more compact to a smaller form factor, as one set of lenses are removed in this design as compared to the offset design for FIG. 2.

Figure 5:
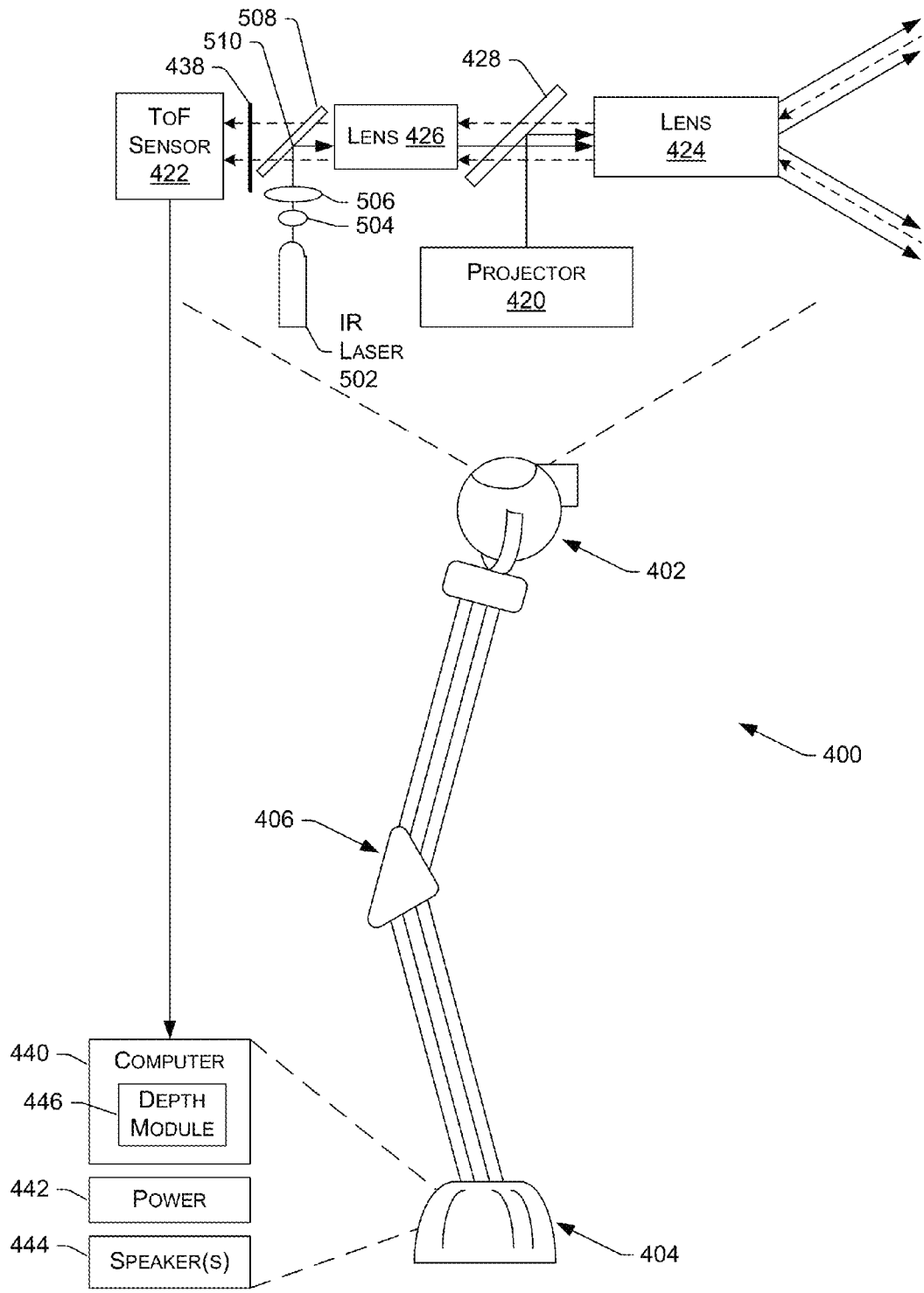
FIG. 5 shows a third implementation of a projection and image capturing system, which is formed as a table lamp similar to the embodiment shown in FIG. 4. In this implementation, the projector and camera share a common optical path through a common lens, and illumination components also share the same optical path.

FIG. 5 shows another implementation of the ARFN 102(2) or 102(3), also shown implemented as part of a table lamp 400. This implementation differs from that of FIG. 4 in that the illumination system also shares the same optical path as the projector 420 and the ToF sensor 422.

In FIG. 5, an IR laser 502 or the IR LEDs 432 of FIG. 4 may be utilized. The IR laser 502 outputs an IR beam that is expanded by a beam expander 504 and then concentrated by a focus lens 506 onto an angled beam splitter 508. In one implementation, the angled beam splitter 508 is formed of a material that passes light (e.g., glass) and has a reflective patch 510 at its center. The focus lens 506 concentrates the IR beam onto the reflective patch 510 of the beam splitter 508, which directs the beam through lens 426, through the beam splitter 428, and out through the lens 424. The reflective patch covers the center portion of the beam splitter 508 and may have any number of shapes, such as circular, oval, polygonal, and so forth. With this arrangement, the size and area of interest can be controllably illuminated by use of the lens 424 and modulated IR laser light. The illuminated area is roughly the same size, or slightly larger, than the area onto which images are projected, as is shown in more detail with reference to FIG. 6.

IR signals scattered from a populated landscape are then collected by the head 402 and passed back through the lens 424, through the beam splitter 428, through lens 426, through the non-reflective portion of the angled reflector 508, through the filter 438, and to the ToF sensor 422. Accordingly, the collected scattered IR light forms an image on the ToF sensor 422 that is used to compute time of flight values for depth analysis of the landscape of the scene.

One of the advantages of placing the IR laser 502 as shown and passing the IR beam through the lens system is that the power used for illumination may be reduced as compared to the implementation of FIG. 4, where the IR LEDs are external to the optical path. Illumination typically degrades inversely proportional to the square of the distance. In FIG. 4, the forward and return paths result in an illumination inversely proportional to the distance to the power of four. Conversely, illumination through the same lens means that the returned light is inversely proportional to square of the distance, and therefore can use less intense illumination to achieve the same results.

It is further noted that essentially any IR device may be used in these systems. Although IR LEDs and IR lasers are shown in the implementations of FIGS. 4 and 5, essentially any device that produces energy within the IR spectrum may be used, such as, for example, a regular red LED.

Both implementations of the integrated projection and camera system afford advantages in addition to a smaller form factor. The projection and camera system allows for simultaneous and coaxial operation of the following functions: (1) visible light high intensity zoomable image projection; (2) illumination of a controlled area of interest with modulated IR light; and (3) collection of scattered IR light from a populated landscape to form an image on a time-of-flight camera/sensor.

Figure 6:
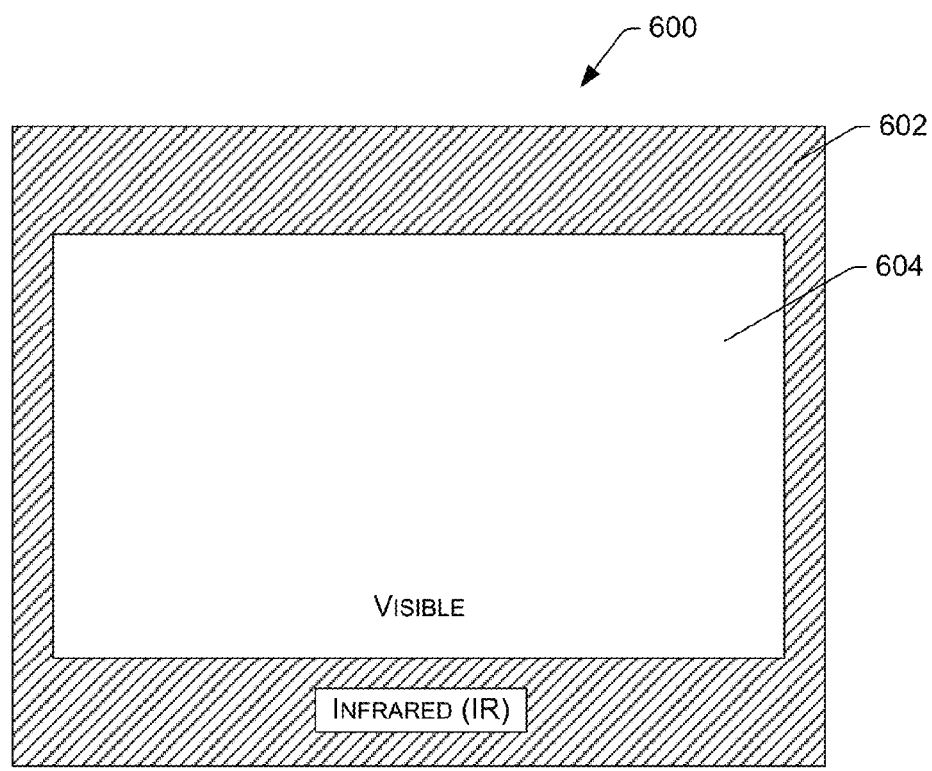
FIG. 6 shows a first area of illumination and a second area of image capture that may be realized by the implementations shown in FIGS. 4 and 5.

FIG. 6 shows a coverage pattern 600 provided by the ARFN 102(2) or 102(3). The coverage pattern 600 has an illumination area 602 covered by the IR-based illumination system. The coverage pattern 600 also has a projection area 604 covered by the projected image. As shown in this footprint, the illumination area 602 is larger than, and encompasses, the projection area 604. However, in other implementations, the illumination area 602 may be equal to or smaller than, and be encompassed by, the projection area 604. The second lens 426 in the device allows for adjustment in the relative coverage to enable overscan or underscan conditions.

Figure 7:
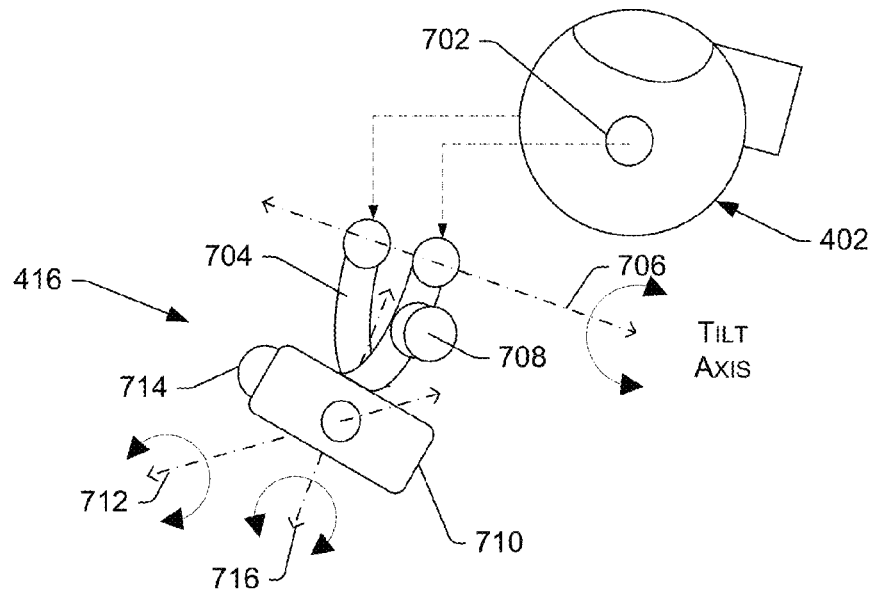
FIG. 7 shows an exploded view of a head and universal mount of the lamp implementation shown in FIGS. 4 and 5.

FIG. 7 shows an exploded view 700 of the head 402 and the universal mount 416 of the lamp implementation shown in FIGS. 4 and 5. Here, the head 402 is generally spherical, although it may be made of any shape, size or form factor. The head 402 has two mounting members 702 on opposing sides of the sphere. The mounting members 702 may be pivotally mounted within a U-shaped cradle 704 to facilitate rotation about a tilt axis 706. A tilt motor 708 may be included to move the head 402 about the tilt axis 706.

The U-shaped cradle 704 is movably mounted relative to structural bracket 710. The U-shaped cradle 704 may be pivoted about a pan axis 712. A pan motor 714 may be included to pivot the U-shaped cradle 704 and head 402 about the pan axis 712. Additionally, the U-shaped cradle 704 may be rotatable about an axis 716 to rotate or spin relative to the structural bracket 710.

Figure 8:
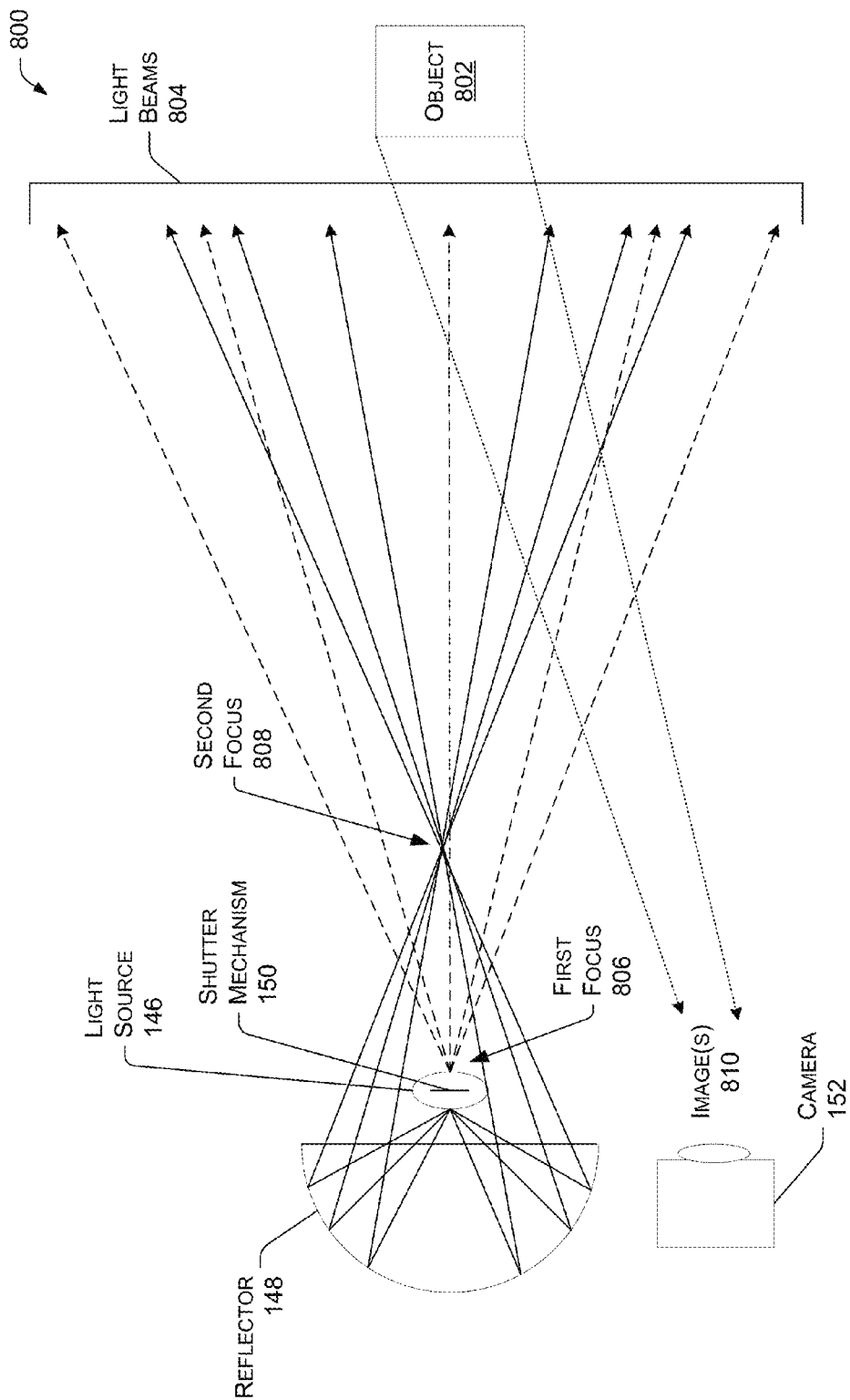
FIG. 8 shows an illustrative system for determining the depth of objects within an environment utilizing a light source, a reflector, a shutter mechanism, and a camera.

FIG. 8 illustrates a system 800 that utilizes a single light source to illuminate an environment in order to determine the depth of objects within the environment. As shown, the system 800 may include a light source 148, a reflector 150, a shutter mechanism 152, a camera 154, an object 802 within the environment, one or more light beams 804 output by the light source 148, a first focus 806 and a second focus 808 associated with the light beams 804, and one or more images 810 captured by the camera 154.

In various embodiments, the light source 148 may illuminate the environment and be in a fixed position such that, once the system 800 is initially calibrated, a 3D representation of the environment or a depth of objects 802 within the environment may be determined without having to recalibrate the system 800. In other words, the positions of the light source 148, the reflector 150, and the camera 154 may be initially determined. Then, since the amount of illumination output by the light source 148 may be fixed or constant, the depth of objects 802 (or the spatial relationships between objects 802) within the environment may be determined without having to consider this variable (e.g., the amount of illumination).

As shown in FIG. 8, the light source 148 may be positioned in close proximity to the reflector 150, which may be an ellipsoidal reflector. That is, the light source 148 may be positioned such that the light may be output both directly at the reflector 150 and away from the reflector 150 towards the environment. When the light beams 804 are directed at the reflector 150 (represented by a solid line), the reflector 150 may then reflect or redirect the light beams 804 within the environment. Alternatively, or in addition, the light beams 804 may be output directly within the environment without being reflected by the reflector 150 (represented by a dashed line).

As discussed above, the shutter mechanism 152 may be any type of shutter (e.g., a mechanical shutter) that blocks or obscures light from being output to the reflector 150 and/or the environment. For instance, assume that the light source 148 is configured to output the light beams 804 towards the reflector 150 and directly towards the environment. In these embodiments, the shutter mechanism 152 may open or close in order to simulate two different light sources 148. That is, the shutter mechanism 152 may be open and may allow light to reflect against the reflector 150, but not directly towards the environment. Here, the light source 148 may appear to be at a point where the reflected light beams converge with one another. Likewise, the shutter may be closed such that light is only directed towards the environment, and not towards the reflector 150, which would cause the light source 148 to appear at its actual location. In other embodiments, the shutter mechanism 152 may remain open and allow the light beams 804 to be output both directly towards the environment and towards the reflector 150 at the same time. Accordingly, by manipulating the shutter mechanism 152, the system 800 may simulate two different light sources 148 without actually manipulating or moving the light source 148.

In various embodiments, the shutter mechanism 152 may be any mechanism that opens or closes the light source 148 so that light is selectively or alternately output. For example, the shutter mechanism 152 may include a rotating mechanism that allows light to be output when the rotating mechanism is at a certain position. That is, the light source 148 may output light directed towards the reflector 150 and the environment, but the light may only be output in a particular direction when an opening on the rotating mechanism is positioned in that particular direction. In other embodiments, the light source 148 may have an opening or hole that is directed to the reflector 150 and/or the environment, and the shutter mechanism 152 may open, close, or obscure that opening at different times. As a result, the shutter mechanism 152 may control the direction in which light is output from the light source 148. Consequently, the shutter mechanism 152 may be any mechanism (e.g., liquid crystal display (LCD) device, microelectromechanical systems (MEMs) device, etc.) that allows for the opening and closing of the light source 148.

In other embodiments, the shutter mechanism 152 may be any device or mechanism that may cause the light beams 804 to appear as if they are being output from two different positions, although a single light source 148 may be utilized. For instance, in addition to a shutter, a lens (e.g., a variable field of view lens, etc.) may be used to selectively output the light beams 804. In these embodiments, the lens may be positioned in front of the light source 148, meaning that the lens may positioned between the light source 148 and the environment. The light beams 804 may be output through the lens and directed towards the environment. More particularly, the light beams 804 may be output through the lens while the lens is set to a first known (e.g., narrow) field of view, which may cause the light beams 804 to be output at a known rate based on the first field of view.

Then, the field of view of the lens may be adjusted (e.g., increased or decreased) to a second known field of view. As a result, when the light beams 804 are output through the lens at the second field of view, the light beams 804 may illuminate the environment at a known different rate. In some embodiments, the ratio of the illumination within the environment when the lens is set to the first field of view and when the lens is set to the second field of view may be utilized to determine the depth of the object 802 within the environment.

As shown, the light source 148 may output the light beams 804 towards the reflector 150 (represented by solid lines; hereinafter "reflected light beams"), which then redirects the light beams 804 towards the environment. The light source 148 may also output the light beams 804 directly towards the environment, without the light beams 804 being directed to, or reflected by, the reflector 150 (represented by dashed lines; hereinafter "direct light beams"). As a result, the source of the light beams 804 may appear to be different, which may cause the reflected light beams 804 and the direct light beams 804 to each have a different focus (e.g., focal point, image point, etc.). For the purpose of this discussion, a focus may correspond to a point where initially collimated rays of light meet or converge after (1) passing through a convex lens, such as a lens associated with the light source 148 (e.g., the direct light beams 804), or (2) being reflected from a concave mirror, such as the reflector 150 (e.g., the reflected light beams 804).

As illustrated in FIG. 8, the first focus 806 may represent a focus or converging point that corresponds to the light beams 804 that are output directly to the environment (e.g., the direct light beams 804). Moreover, the second focus 808 may correspond to a different focus or converging point that corresponds to the light beams 804 that are first reflected by the reflector 150 onto the environment (e.g., the reflected light beams 804). In various embodiments, the first focus 806 and the second focus 808 may represent a point in which the light beams 804 are output towards the environment. Moreover, the first focus 806 and the second focus 808 may also correspond to a distance to a particular object 802 within the environment. Therefore, based at least partly on the size of the ellipsoidal reflector 150 and the distance between the focal points (e.g., the distance between the first focus 806 and the second focus 808), the system 800 may simulate two different light source positions utilizing a single light source 148. As discussed in further detail below, and with respect to the first focus 806 and the second focus 808, the actual distance to that object 802 may be determined based at least partly on a ratio between the estimated distances to the object 802.

Upon outputting the light beams 804 within the environment, which may illuminate the environment, the camera 154 may capture one or more images 810 of the illuminated environment. In various embodiments, the camera 154 may capture a first image 810 at a time when the light beams 804 are directed towards the environment (e.g., direct light beams 804). The camera 154 may also capture a second image 810 at a time when the light beams 804 are directed towards the reflector 150 and then reflected within the environment (e.g. reflected light beams 804). Accordingly, the camera 154 may capture two different images 810 with varying brightness or illumination.

As stated above, the light beams 804 may correspond to visible or non-visible light and the images 810 captured by the camera 154 may be two-dimensional (2D) images 810. In various embodiments, the camera 154 may be an RGB camera 154 that captures RGB images 810, a monochrome camera 154 having a filter that is compatible with the type of light being output by the light source 148, or any other type of camera 154. In any case, the camera 154 may be configured to capture images 810 of the type of light that is emitted within the environment. For instance, if the light source 148 outputs white or colored light, the camera 154 may be an RGB camera 154. Similarly, provided that infrared light is output by the light source 148, an infrared camera 154 may be utilized to capture the images 810. In some embodiments, infrared light may be used to map the environment (e.g., room, scene, etc.) without being visible to, or disturbing, users within the environment. Accordingly, the camera 154 may be configured to capture images 810 of the environment when the environment is illuminated by the light source 148.

Furthermore, the camera 154 may be synchronized with the light source 148 and the shutter mechanism 152 so that the camera 154 is able to capture two different images 810—a first image 810 that corresponds to the environment being illuminated by the direct light beams 804 and a second image 810 that corresponds to the environment being illuminated by the reflected light beams 804. As a result, the first image 810 may correspond to the first focus 806 and the second image 810 may correspond to the second focus 808. Alternatively, the light source 148 may pulse the light such that the camera 154 can capture an image 810 at each focal point (e.g., the first focus 806 and the second focus 808).

Based at least in part on the first image 810 and the second image 810, a third image 810 (also referred to as the "final image") that represents a 3D orientation of the environment may be generated. In particular, the system 800 may compare the brightness or illumination of the first image 810 corresponding to the first focus 806 and the brightness or illumination of the second image 810 taken from the second focus 808 in order to determine a distance to the object 802 within the environment. This may be performed by conducting a pixel-by-pixel comparison between the first image 810 and the second image 810. That is, the system 800 may measure the intensity of the light (including ambient light) at each focal point, where the first focus 806 corresponds to the direct light beams 804 and the second focus 808 corresponds to the reflected light beams 804. Since the measured intensities of the light may each indicate an estimated distance to the object 802, the measured intensities may be compared to determine the distance to the object 802. By performing this process for each object 802 within the environment, the system 800 may determine a 3D representation of the environment, which may include the depth of, or a distance to, to a particular object 802 and/or spatial relationships between objects 802 within the environment.

In various embodiments, the depth of or the distance (D) to the object 802 may be determined using the following equation:

$$D = \frac{\text{delta}}{\sqrt{(b_1/b_2)} - 1}$$

where delta may correspond to the measured distance or difference between the first focus 806 and the second focus 808, $b_1$ may correspond to a pixel value derived from the first image 810 (e.g., the intensity of the direct light beams 804 at the first focus 806), and $b_2$ may correspond to a pixel value derived from the second image 810 (e.g., the intensity of the reflected light beams 804 at the second focus 808). That is, the luminances determined for the direct light beams 804 and the reflected light beams 804 may uniquely determine the distance to the object 802.

In addition, the intensity of the direct light beams 804 ($b_1$) may be determined as follows:

$$b_1 = \frac{B}{(d_1)^2(R) + a}$$

where B may correspond to the brightness or illumination of the light source 148, $d_1$ may correspond to the distance from the light source 148 to the first focus 806, R may correspond to the reflectivity of the object 802, and a may correspond to the amount of ambient light being reflected off of the object 802.

Similarly, the intensity of the reflected light beams 804 ($b_2$) may be determined as follows:

$$b_2 = \frac{B}{(d_2)^2(R) + a}$$

where B may correspond to the brightness or illumination of the light source 148, $d_2$ may correspond to the distance from the light source 148 to the second focus 808, R may correspond to the reflectivity of the object 802, and a may correspond to the amount of ambient light being reflected off of the object 802.

As shown above, a larger delta or distance between the two focal points (e.g., the first focus 806 and the second focus 808) may correspond to a higher resolution of the images 810 captured by the camera 154. As a result, the system 800 may be able to determine the distance to, and between, objects 802 within the environment more accurately. In addition, the foregoing formulas may be independent of subject albedos, which may refer to the fraction that light is reflected or scattered back into the environment.

Accordingly, by alternatively illuminating an environment utilizing a single light source 148 and an ellipsoidal reflector 150, the system 800 may illuminate the environment and capture, in two different images 810, light beams 804 having different focal points. From these images 810, and the focal points corresponding to each image 810, a depth map of the environment may be generated. The 3D representation of the environment may allow the system 800 to determine the distance to a particular object 802, and the spatial relationships between objects 802 within the environment. This information may be determined utilizing a single light source 148 and without having to recalibrate the system 800, which may save a significant amount of resources (e.g., time, cost, etc.).

Figure 9:
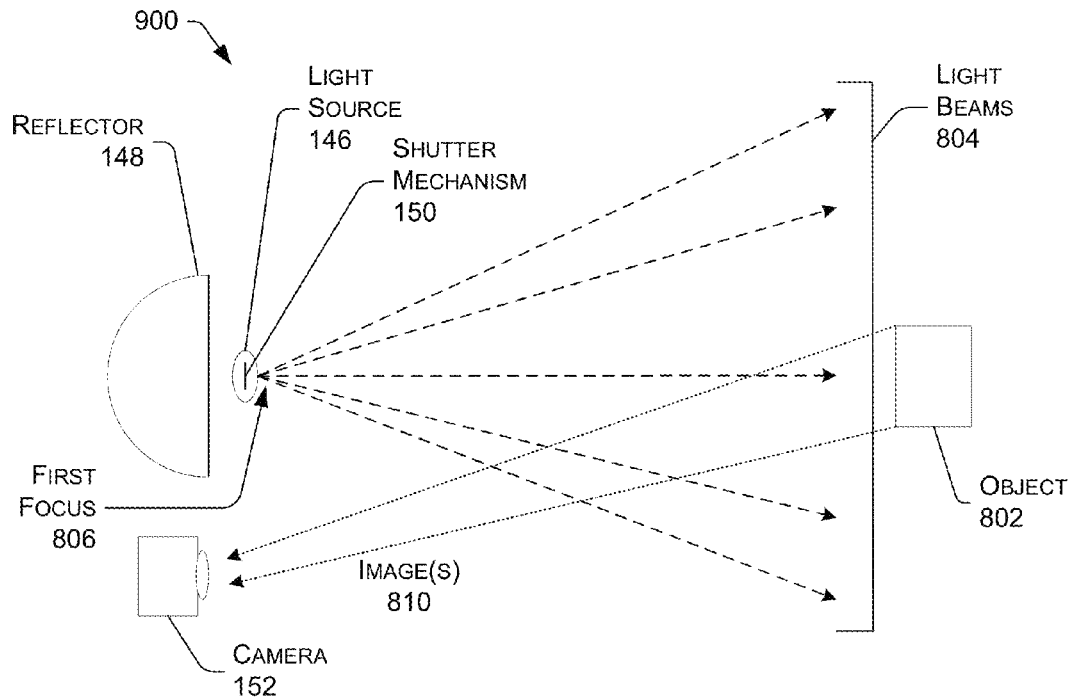
FIG. 9 shows an illustrated system for determining the depth of objects within the environment shown in FIG. 8.

FIG. 9 illustrates a system 900 that represents an environment for determining the depth of objects within the environment. In certain embodiments, the system 900 may correspond to the system 800 illustrated in FIG. 8. As shown, the system 900 may include a light source 148, a reflector 150 (e.g., an ellipsoidal reflector), a shutter mechanism 152 associated with the light source 148, an object 802 within the environment, light beams 804 that are output by the light source 148, and a camera 154 that may capture images 810 of the environment. The system 900 may also include a first focus 806 that represents a point where the light is emitted from the light source 148. As discussed in FIG. 8, FIG. 9 may illustrate the embodiment when light is output directly within the environment, instead of being reflected or redirected by the reflector 150.

In these embodiments, the shutter mechanism 152 may cause the light source 148 to output the light beams 804 away from the reflector 150 and directly towards the environment. As a result, the first focus 806 may represent the point at which the light beams 804 are output from the light source 148, which may be in close proximity to the light source 148. Upon illuminating the environment, the camera 154 may capture an image 810 of the environment. This image 810 may be used in combination with a second image 810 to determine the distance to the object 802, and the spatial relationships between different objects 802 within the environment. As discussed in FIG. 10, the second image 810 may be taken when light is output to the reflector 150, which may then reflect the light within the environment.

Figure 10:
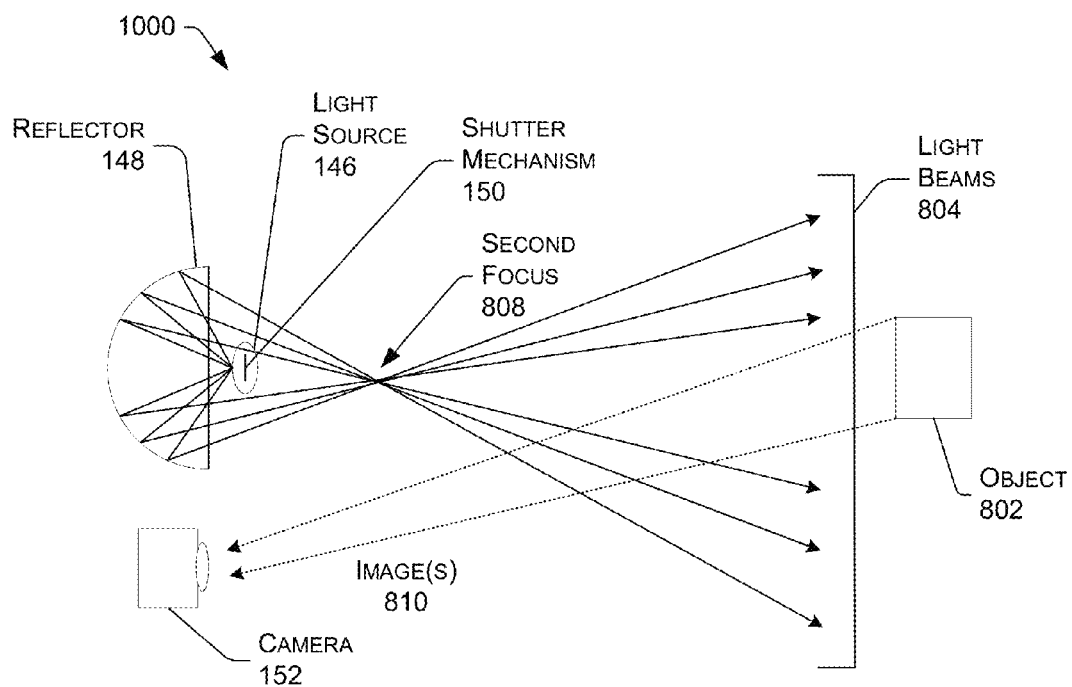
FIG. 10 shows an illustrated system for determining the depth of objects within the environment shown in FIG. 8 based at least in part on a reflector.

FIG. 10 illustrates a system 1000 that represents an environment for determining the depth of objects within the environment. In certain embodiments, the system 1000 may correspond to the system 800 illustrated in FIG. 8. As shown, the system 1000 may include a light source 148, a reflector 150 (e.g., an ellipsoidal reflector), a shutter mechanism 152 associated with the light source 148, an object 802 within the environment, light beams 804 that are output by the light source 148, and a camera 154 that may capture images 810 of the environment. The system 1000 may also include a second focus 808 that represents a point where the light beams 804 converge after being reflected by the reflector 150 towards the environment. As discussed in FIG. 8, FIG. 10 illustrates the embodiment when light is directed to the reflector 150 and redirected within the environment, instead of the light being output directly within the environment.

In these embodiments, the shutter mechanism 152 may cause the light source 148 to output the light beams 804 towards the reflector 150 and away from the environment. As a result, the second focus 808 may correspond to a point where the reflected light beams 804 converge within the environment, which may occur at a point a certain distance from the light source 148. Upon illuminating the environment, the camera 154 may capture an image 810 of the environment. This image 810 may be used in combination with an image 810 that was captured when the light was output directly to the environment in order to determine the distance to the object 802, and the spatial relationships between different objects 802 within the environment.

Figure 11:
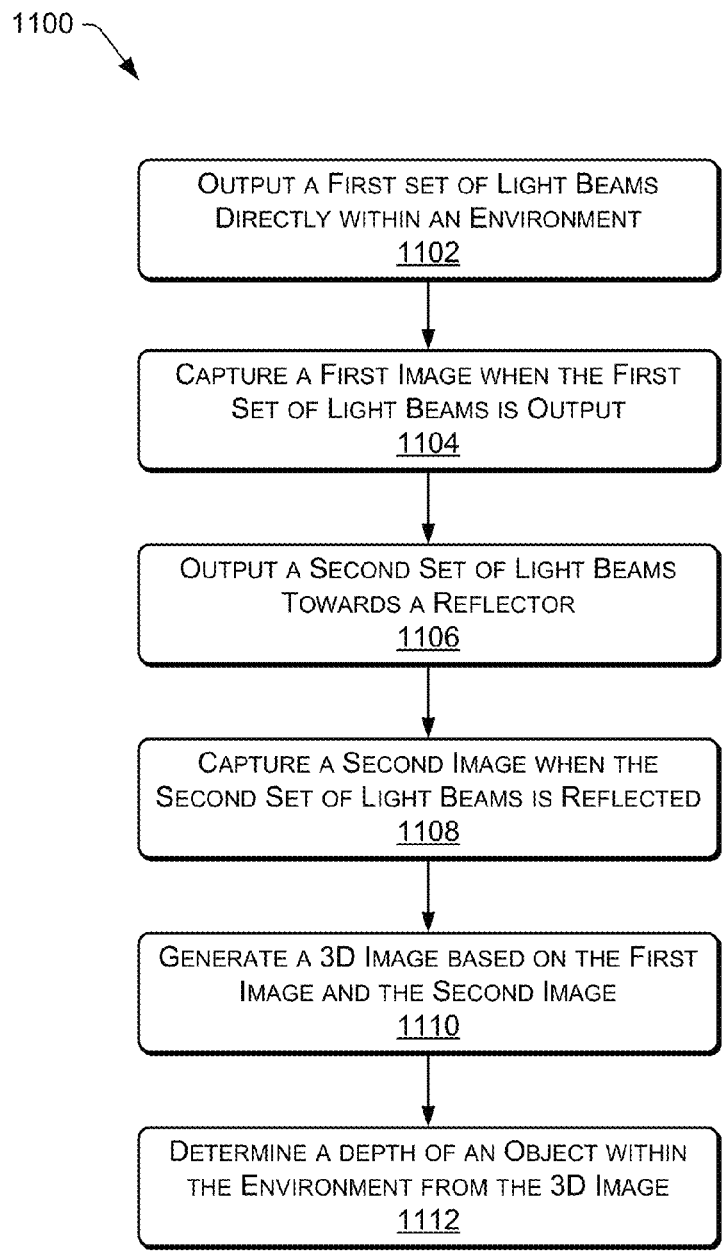
FIG. 11 shows an illustrative process of determining the depth of objects within an environment, which may include an enhanced augmented reality environment that includes a projection, reflection, and camera system.

FIG. 11 shows an illustrative process 1100 of determining the depth of objects within an environment utilizing a single light source and an ellipsoidal reflector. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

Block 1102 illustrates outputting a first set of light beams directly within an environment. In various embodiments, a light source may output light within an environment, such as a scene or a room, that includes one or more objects (e.g., users, furniture, etc.). Moreover, a shutter mechanism associated with the light source may cause the light source to alternatively or selectively output light in different directions. For example, the shutter mechanism may cause the light source to output light in a particular direction towards the environment.

Block 1104 illustrates capturing a first image when the first set of light beams is output. More particularly, a camera within the environment may capture a first image of the environment (including the one or more objects) when the first set of lights beams are output. That is, the first image may capture the environment as illuminated by the first set of light beams. A first focus or focal point may also be identified, where the first focus corresponds to a point in which the first set of light beams are output. Accordingly, the first focus may represent a first position of the light source.

Block 1106 illustrates outputting a second set of light beams towards a reflector. In addition to the light source, the environment may include a reflector, such as an ellipsoidal reflector or mirror, that may reflect light towards the environment. As discussed herein, the shutter mechanism may cause the light source to output light beams at the reflector, and away from the environment.

As a result of directing light towards the reflector, the reflector may reflect or redirect the second set of light beams towards the environment. Therefore, the first set of light beams and the second set of light beams may each illuminate the environment, with the difference being that the second set of light beams are first output in a different direction and then reflected in a direction in which the first set of light beams were output. The first set of light beams and the second set of light beams may also illuminate the environment at different times, provided that the shutter mechanism causes the light source to alternatively or selectively output light within the environment.

Block 1108 illustrates capturing a second image when the second set of light beams is reflected. In some embodiments, in addition to the first image, the camera may also capture a second image of the environment when the second set of light beams are reflected or redirected within the environment. A second focus or focal point may then be determined, which may correspond to a point where the reflected second set of light beams converge or cross paths. By reflecting the second set of light beams within the environment, the second focus may represent or simulate a second position of the light source, although only a single light source is actually present within the environment. That is, it may appear that the first set of light beams and the second set of light beams are being output from different locations or positions. In some instances, the camera may be synchronized with the light source and/or the shutter mechanism so that the camera may capture images at a time when the light is output by the light source.

Block 1110 illustrates generating a 3D image based on the first image and the second image. More particularly, the system may generate a depth map that represents a 3D orientation of the environment based at least in part on the first image and the second image. In some embodiments, the 3D image may be generated by performing a pixel-by-pixel comparison of the brightness or illumination associated with the first image and the second image.

Block 1112 illustrates determining a depth of an object within the environment from the 3D image. In certain embodiments, the distance to a particular object that is within the environment and that is captured in the images may be determined. More particularly, this distance or depth may be determined by calculating a distance between the first focus corresponding to the first set of light beams and the second focus corresponding to the second set of light beams. The foregoing process may be repeated for different objects within the environment such that the spatial relationships between the objects within the environment may be determined. In some embodiments, the spatial relationships between the objects may be determined after the system is initially calibrated against an object at a known distance. As a result, the system may generate a 3D depth map of the environment by effectively moving a single light source between two or more positions, without actually moving the light source, which may alleviate the need to recalibrate the system.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   a light source configured to output light beams within a physical space;
   a shutter mechanism associated with the light source and configured to selectively cause:
   a first set of the light beams from the light source to be directed towards the physical space and away from an ellipsoidal reflector, the first set of light beams illuminating the physical space at a first time; and
   a second set of the light beams from the light source to be directed towards the ellipsoidal reflector and away from the physical space, the ellipsoidal reflector reflecting the second set of light beams towards the physical space such that the second set of light beams as reflected by the ellipsoidal reflector illuminates the physical space at a second time;
   a camera configured to capture a first image of the physical space at the first time and a second image of the physical space at the second time; and
   a depth determination module configured to generate a depth map of the physical space based at least in part on the first image and the second image, the depth map being used to determine a depth of an object within the physical space.

2. The system as recited in claim 1, wherein the depth of the object is determined based at least in part on a distance between a first focus and a second focus, the first focus being associated with the first set of light beams and being determined from the first image and the second focus being associated with the second set of light beams and being determined from the second image.

3. The system as recited in claim 2, wherein the first focus represents a first point corresponding to a location where the first set of light beams are emitted by the light source and the second focus represents a second point corresponding to where the second set of light beams converge in response to being reflected by the ellipsoidal reflector.

4. The system as recited in claim 2, wherein a first illumination of the physical space at the first time differs from a second illumination of the physical space at the second time based at least in part on the first focus and the second focus.

5. A method comprising:
   outputting a first set of light beams towards a physical space;
   capturing a first image of the physical space at a first time corresponding to when the first set of light beams are output towards the physical space or after the first set of light beams are output towards the physical space;
   outputting a second set of light beams towards a reflector, the second set of light beams being redirected onto the physical space by the reflector;
   capturing a second image of the physical space at a second time corresponding to when the second set of light beams are redirected onto the physical space by the reflector or after the second set of light beams are redirected onto the physical space by the reflector; and
   determining a depth of an object within the physical space based at least in part on a comparison between the first image and the second image.

6. The method as recited in claim 5, wherein the first set of light beams and the second set of light beams are alternately or selectively output using a shutter mechanism associated with a light source.

7. The method as recited in claim 5, further comprising:
   generating a depth map based at least in part on the first image and the second image;
   and wherein the determining the depth of the object within the physical space comprises determining the depth of the object based at least in part on the depth map, the depth map providing information relating to spatial relationships between the object and other objects within the physical space.

8. The method as recited in claim 5, wherein the determining the depth of the object within the physical space is based at least in part on a distance between a first focus and a second focus, and wherein:
the first focus is associated with the first set of light beams and is determined from the first image, the first focus representing a first point corresponding to where the first set of light beams are emitted by a light source; and
the second focus is associated with the second set of light beams and is determined from the second image, the second focus representing a second point corresponding to where the second set of light beams converge in response to being redirected towards the physical space by the reflector.

9. The method as recited in claim 8, wherein the physical space is illuminated by the first set of light beams at the first time, wherein the physical space is illuminated by the second set of light beams at the second time, and further comprising:
determining a ratio of a first illumination level of the physical space associated with the first image and a second illumination level of the physical space associated with the second image; and
determining the depth of the object within the physical space based at least in part on the ratio.

10. The method as recited in claim 5, wherein the second set of light beams are redirected towards the physical space by an ellipsoidal reflector that is associated with a light source that outputs the first set of light beams and the second set of light beams.

11. A method comprising:
outputting a first set of light beams and a second set of light beams within a physical space, the second set of light beams being redirected towards the physical space by an ellipsoidal reflector;
determining a distance between a first focus and a second focus, the first focus corresponding to the first set of light beams and the second focus corresponding to the second set of light beams; and
determining a depth of an object within the physical space based at least in part on the distance.

12. The method as recited in claim 11, further comprising:
outputting, by a light source, the first set of light beams and the second set of light beams; and
directing, by a shutter mechanism associated with the light source, the first set of light beams towards the physical space and the second set of light beams towards the ellipsoidal reflector.

13. The method as recited in claim 11, further comprising causing, by a shutter mechanism, the first set of light beams and the second set of light beams to illuminate the physical space from two coaxial points corresponding to the first focus and the second focus.

14. The method as recited in claim 11, further comprising:
capturing a first image of the physical space as illuminated by the first set of light beams;
capturing a second image of the physical space as illuminated by the second set of light beams; and
determining the depth of the object based at least in part on the first image and the second image.

15. The method as recited in claim 14, wherein the depth of the object within the physical space is based at least in part on a ratio of the distance between the first focus and the second focus and an illumination associated with each of the first image and the second image.

16. The method as recited in claim 14, further comprising:
generating a depth map of the physical space based at least in part on the first image and the second image; and
determining the depth of the object based at least in part on the depth map.

17. A system comprising:
a light source configured to output light beams within a physical space;
a shutter mechanism associated with the light source and configured to cause the light source to alternatively output a first set of the light beams that are directed towards the physical space and a second set of the light beams that are directed towards an ellipsoidal reflector, the ellipsoidal reflector reflecting the second set of light beams towards the physical space;
a camera configured to capture a first image of the physical space at a first time that corresponds to when the first set of light beams are output or after the first set of light beams are output and a second image of the physical space at a second time that corresponds to when the second set of light beams are reflected by the ellipsoidal reflector or after the second set of light beams are reflected by the ellipsoidal reflector; and
a depth determination module configured to determine a depth of an object within the physical space based at least in part on the first image and the second image.

18. The system as recited in claim 17, wherein the light source is a single light source, and wherein the depth of the object within the physical space is determined without moving the light source.

19. The system as recited in claim 17, wherein the depth of the object within the physical space is determined based at least in part on a first focus associated with the first set of light beams and a second focus associated with the second set of light beams.

20. The system as recited in claim 19, wherein the physical space is illuminated by the first set of light beams at the first focus and by the second set of light beams at the second focus.

21. The system as recited in claim 17, wherein a type of the camera corresponds to a type of light output by the light source.

22. The system as recited in claim 17, wherein the camera is synchronized with the shutter mechanism so that the camera captures the first image when the physical space is illuminated by the first set of light beams and captures the second image when the physical space is illuminated by the second set of light beams.

* * * * *